Figure 1:
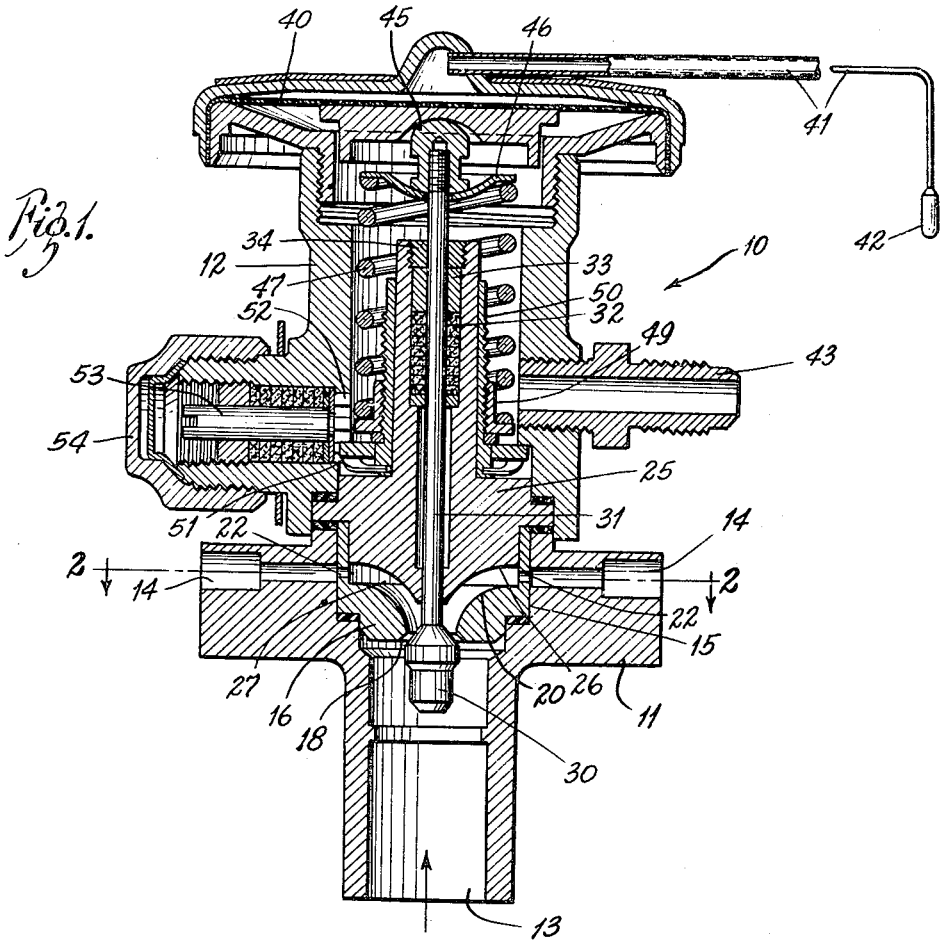

Nov. 20, 1956 — J. A. SCHENK — 2,771,092

MULTI-OUTLET EXPANSION VALVE

Filed Jan. 23, 1953

INVENTOR:
JOHN A. SCHENK
By Kingsland, Rogers & Ezell
ATTORNEYS

United States Patent Office 2,771,092
Patented Nov. 20, 1956

2,771,092

MULTI-OUTLET EXPANSION VALVE

John A. Schenk, Clayton, Mo., assignor to Alco Valve Company, University City, Mo., a corporation of Missouri Application January 23, 1953, Serial No. 332,859

4 Claims. (Cl. 137—561)

The present invention relates to a multi-outlet expansion valve, the primary object of which is to obtain the most even distribution of a refrigerant passing through an expansion valve for distribution therefrom into a plurality of evaporators, with optimum stability over a wide range of positions of the expansion valve with respect to its valve seat.

Heretofore, expansion valves for multi-outlet use have been designed with the objective of obtaining the most even distribution, but they have had deficiencies of operation that are overcome with the present arrangement. In some cases, the expansion valve has been separated from the distribution device, but this has obvious disadvantages.

In the present valve, there is a valving member operated toward and from a seat at the inlet side of the valve body. Immediately beyond this seat there is provided a distribution passage arrangement wherein the distribution passage diverges more or less radially and away from the valve seat, in such a way as to spread the refrigerant fluid sufficiently for its being directed into a plurality of outlets, while avoiding undesirable turbulence and pressure drops between the valve seat and the several outlets. Means are employed to maintain certain pressure relationships in the distribution passage means, these means specifically comprising constrictions that provide a higher pressure in the distribution passage means than that in the outlets.

It has been discovered that for the most even distribution over the widest range of operation of the valve, the ratio of the total area of the several orifices to the effective port area of the valve should be within the range of from 1.5:1 to 4.5:1, and preferably should be within the range of from about 2:1 to 3:1.

In the present valve construction, the objectives aforesaid are attained. Also, a construction is provided that affords greater flexibility and less cost of manufacture for a line of sizes of these valves. Certain parts are designed so that only they need be prepared to accommodate various arrangements of outlets, while the remaining parts without structural alteration can be used for various outlet arrangements. These and other objects will appear from the description to follow.

Figure 2:
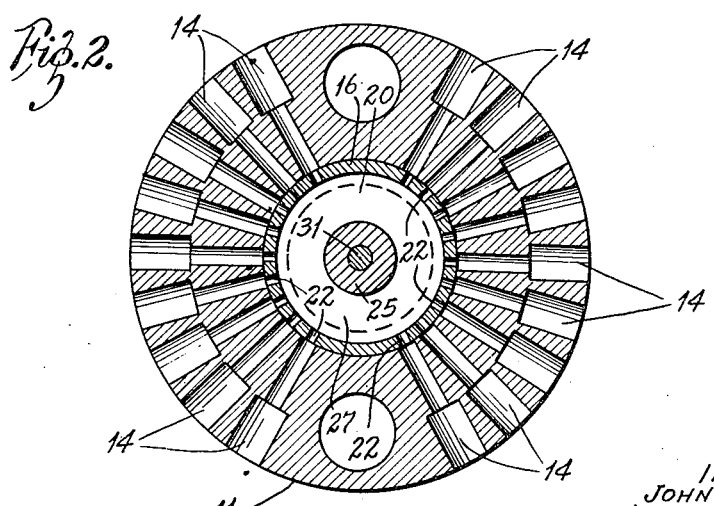

In the drawings:

Fig. 1 is a diametrical cross section through a valve of the present character; and Fig. 2 is a horizontal section taken on the line 2—2 of Fig. 1.

The valve indicated generally at 10 is here illustrated essentially as a constant superheat expansion valve with external equalizer connections. But a valve with increasing or decreasing superheat characteristics as the evaporator temperature is lowered can be used. It comprises a lower valve body member 11 and an upper valve body member 12 that are secured together by suitable means not shown, such as screws, so that they may be separated and reattached as desired.

The lower valve body 11 has an inlet 13 and a plurality of outlets 14. In the present illustration, the outlets 14 are at right angles to the inlet 13, but this angularity is subject to change with modifications of the design of the valve itself within limits that are apparent or that will be described. The lower valve body has a shouldered recess 15 extending centrally down through it to receive a cage 16. The cage is generally cup-shaped and, as will appear, is clamped into place with appropriate gaskets when the two valve body portions 11 and 12 are attached together.

The wall of the cage 16 has a valve port 18 through the bottom which opens into the inlet 13. Preferably it is chamfered. Above the opening 18 the wall of the cage smoothly curves or slopes upwardly and outwardly as shown at 20. At the upper end of the curved wall 20 the vertical extensions or side walls of the cage 16 are provided with a plurality of orifices 22 which register with the several outlets 14 of the lower valve body 11 when the cage is in place.

An insert 25 has its lower end shaped to fit down into the cage 16 with a flange that engages over the top of the cage to limit the amount of insertion. The lower surface of the insert 25 is sloped or curved at 26 in a manner similar to the curve 20 on the cage, so that these two parts together form a flaring distribution chamber or passage 27 that extends from the valve seat 18 to the orifices 22, with such configuration as to provide an even flow in all directions with minimum turbulence.

It will be understood that the change in direction illustrated in this preferred example of the invention is approximately 90°, but it may be different from 90° depending upon other structural characteristics of the valve. In any case, it must be divergent from the valve seat to enable it to be connected into a plurality of outlets, and it must be smooth and even as it diverges.

The insert 25 acts also as a guide for the valve. The valve comprises a valve proper or valve head 30 that is movable toward and from the seat 18, to close and open the valve, respectively. A stem 31 supports the valve head. It is guided as shown at its lower end by the lower part of the insert 25. A packing arrangement 32 is provided at the upper end of the valve stem 31, there being a valve guide 33 above the packing and the whole being surmounted by a packing nut 34. The illustrated valve construction is designed for external equalization, although internal equalization, as is known in the art, may be employed with the present invention.

The actuating mechanism for the valve is here shown as a conventional diaphragm 40 actuated from above by fluid pressure conducted by a tube 41 from a remote bulb 42. The bulb 42 is normally located on or in the common evaporator outlet line in the refrigeration system. The space below the diaphragm is subjected to pressure coming through an external equalizer connection 43 which may be connected into the evaporator system adjacent its outlet or at another suitable point from which the desired pressure control may be obtained. This pressure, of course, acts oppositely to the pressure from the bulb 42.

Additionally, there is spring pressure acting below the diaphragm. In the present illustration, the upper end of the valve stem 31 has a cap nut 45 on it below which a washer 46 receives the upper end of a coil spring 47. The lower end of the coil spring is mounted upon an internally threaded flanged collar 49 that is mounted upon an externally threaded sleeve 50. As is known in the art, the collar 49 is held non-rotatably in place, but the sleeve 50 may be rotated so that the collar is moved axially or toward and from the diaphragm, thereby to adjust the force of the spring 47. Illustrated here is a gear type adjusting means consisting of teeth on a flange 51 of the collar 50 that mesh with a spur gear 52 on the end of an adjustment shaft 53 which extends out through packing so as to be accessible for adjustment. It is covered by a removable cap 54.

The particular operating parts of the valve above described are not part of the present invention.

It has been found that the sum of the areas of all of the orifices 22 should bear a definite ratio to the effective area of the port 18. The effective area of the port 18 in the present valve would be obtained by striking a line from the innermost edge of the port 18 to the valve head 30 perpendicular to the conical surface thereof that is adjacent to the valve seat, and then developing a frusto-conical surface by carrying such line around the valve seat circle. The ratio of the total area of the several orifices 22 to this effective port area should be at least 1.5:1 and should not exceed 4.5:1, with the preferred range from 2–3:1. In the illustrated valve, the ratio is about 3:1.

It is desirable to keep the separation of the two surfaces 20 and 26, which define the lower and upper limits of the diverging distribution passage 27, only slightly larger than the diameter of the orifices 22.

In this valve, having a separate cage, the subassemblies may be completed prior to orders. Then upon order, the cages may be drilled for the number of orifices required by the customer, the assembly completed, with the valve seat drilled after assembly, preferably. One size of cage is suitable for a "family" of sizes of outlets. The lower valve body 11 may preferably be changed so its number of outlets corresponds to that of the cage, or some of its outlets may be plugged. In any case, if the diverging passage 27 is too large, excessive turbulence may result.

The total movement of the valve 30 in its normal range is small. In a typical valve, the total movement may be .064 inch.

Operation

The operation of the valve 30 under the influence of its power means is the same as that in any essentially constant superheat thermostatic expansion valve, as is known in the art. Conventionally, with the bulb 42 disposed adjacent an evaporator outlet and the external equalizer connection 43 connected into an evaporator outlet line, the opening forces on the valve are those responsive to increasing temperatures at the bulb 42 adjacent the evaporator outlet producing vapor pressure acting above the diaphragm 40. The closing forces are the substantially fixed force of the spring 47 and the refrigerant pressure at the evaporator outlet which is conducted through the external equalizer connection 43 to below the diaphragm 40. This makes the valve maintain essentially a constant superheat in the evaporators by adjusting its position toward and from the seat 18 to adjust the refrigerant flow past it.

The refrigerant moving past the valve seat 18 enters the diverging distribution passage 27, where it is conducted to the several orifices 22 smoothly and without abrupt change in direction of flow. These orifices, being smaller than the passage 27, maintain an intermediate pressure within the distribution passage 27 that is greater than the individual pressures in the several outlets 14, though less than that within the inlet 13. This is necessary in order to get even distribution. Yet the total orifice area must be greater than the effective port area of the valve at its maximum open position if the pressure conditions in the several outlets are to respond to variations in the position of the valve. It is for this latter reason that the minimum ratio is 1.5:1, and preferably as much as 2:1.

As the valve travels toward closed position, the operating ratio of total orifice area to effective port area is enlarged. It is for this reason that the maximum ratio of total orifice area to effective port area should not exceed 4–4.5:1, which will still provide for a pressure drop through the orifices 22 and a consequent maintenance of a pressure within the diverging passage 27 sufficient to afford even distribution.

Illustrative pressure values demonstrate the gain found by the present invention. First, it is to be observed that this valve is designed to accommodate fluid that, in a very large percentage of cases, becomes a liquid-gas phase mixture in the distribution passage. This contrasts with those valves the operation of which involved—at least in theory—the maintenance of liquid phase both prior and subsequent to the valve, a condition usually requiring substantial subcooling of the fluid. The present valve operates either with liquid or with gas-liquid conditions.

Assuming inlet pressure of 125 p. s. i. and outlet pressure of 40 p. s. i., with a 3:1 ratio of orifice to effective port area at open valve position, the intermediate pressure in the distribution chamber may be 55 p. s. i.—a drop of 70 p. s. i. across the valve 30. Then, at a throttling position of the valve, the inlet pressure remains 125 p. s. i. and the outlet substantially the same, or perhaps down to about 30 p. s. i., the distribution chamber pressure will be about 40 p. s. i.—a drop of 85 p. s. i. The variation in pressure drop across the valve 30 between open and closed positions is 15 p. s. i.

Contrast a valve with a 1:1 ratio. Corresponding values of inlet and outlet would find intermediate pressures at open position of the valve 30 to be 105 p. s. i., and at closed position to be 55 p. s. i., a difference in pressure drop across the valve of 50 p. s. i.

The 1:1 ratio valve has such a great drop across the valve between open and closed positions that the valve is influenced by the pressure drop. This is greatly reduced in the present valve.

Without the streamlining of the distribution passage, turbulence develops that renders even distribution impossible. With the streamlined passage and the high ratio of areas aforesaid, the fluid has even distribution over a very broad range of positions of the valve 30, without losing stability.

What is claimed is:

1. In a multi-outlet valve construction: a body member having an inlet and a plurality of outlets, the outlets being generally circularly arranged about the inlet but being axially displaced therefrom; a partition wall providing a valve port adjacent the inlet, the valve port being transverse to the axis about which the outlets are disposed, the wall on the outlet side of the valve port diverging from the valve port outwardly and axially around the axis of the outlets to adjacent the outlets in a smooth, substantially continuous shape; a second wall spaced from the first, extending from adjacent the port to adjacent the outlets, and of a shape corresponding to the first so that the two provide a distribution passage flaring outwardly from the valve port to the outlets; a valve movable toward and from the valve port; and the total area of the outlets being from 1.5 to 4.5 times the effective area of the valve port when fully opened.

2. In a multi-outlet valve construction: a body member having an inlet and a plurality of outlets, the outlets being generally circularly arranged about the inlet but being axially displaced therefrom; a partition wall providing a valve port adjacent the inlet, the valve port being transverse to the axis about which the outlets are disposed, the wall on the outlet side of the valve port diverging from the valve port outwardly and axially around the axis of the outlets to adjacent the outlets in a smooth, substantially continuous shape; a second wall spaced from the first, extending from adjacent the port to adjacent the outlets, and of a shape corresponding to the first so that the two provide a distribution passage flaring outwardly from the valve port to the outlets; a valve movable toward and from the valve port; and the total area of the outlets being from about 2 to 3 times the effective area of the valve port when fully opened.

3. The combination of claim 1, wherein the first wall comprises a cup-like cage inserted into the body member, having the valve port through the middle of its bottom, and having outlet ports through the side walls, and wherein the second wall comprises an insert fitted into the cup-like cage.

4. The combination of claim 1, wherein there are orifice means at the outlets providing a constricting orifice between the distribution passage means and each outlet to act in maintaining a higher fluid pressure in the distribution passage means than in the outlets.

References Cited in the file of this patent
UNITED STATES PATENTS

| | | |
|---|---|---|
| 22,170 | Douglas | Nov. 30, 1858 |
| 232,775 | Stevens | Sept. 28, 1880 |
| 1,145,838 | Howes | July 6, 1915 |
| 1,920,505 | Henney et al. | Aug. 1, 1933 |
| 2,144,898 | Shrode | Jan. 24, 1939 |
| 2,182,718 | Anderson | Dec. 5, 1939 |
| 2,220,831 | Swart | Nov. 5, 1940 |
| 2,277,999 | Thompson | Mar. 31, 1942 |
| 2,282,879 | Norris | May 12, 1942 |
| 2,579,034 | Dube | Dec. 18, 1951 |
| 2,637,985 | Ray | May 12, 1953 |